United States Patent [19]
Bledsoe

[11] Patent Number: 5,374,037
[45] Date of Patent: Dec. 20, 1994

[54] CLAMP RING ASSEMBLY FOR AIR SPRING

[75] Inventor: Brent A. Bledsoe, Fishers, Ind.

[73] Assignee: Bridgestone/Firestone, Inc., Akron, Ohio

[21] Appl. No.: 123,825

[22] Filed: Sep. 20, 1993

[51] Int. Cl.$^5$ ................................................ F16F 9/04
[52] U.S. Cl. ............................... 267/64.27; 267/64.24
[58] Field of Search ............... 267/64.27, 64.24, 64.23, 267/64.21, 64.19, 122, 118, 153; 74/18.2; 403/288, 50, 51

[56] References Cited

U.S. PATENT DOCUMENTS

| | | | |
|---|---|---|---|
| 2,149,040 | 2/1939 | Binder et al. | 188/88 |
| 3,788,628 | 1/1974 | Hotz, Jr. et al. | 267/65 R |
| 3,819,166 | 6/1974 | Ellis et al. | 267/64 |
| 4,378,935 | 4/1983 | Brown et al. | 267/64.27 |
| 4,489,474 | 12/1984 | Brown et al. | 29/508 |
| 4,564,177 | 1/1986 | Leonard | 267/64.24 |
| 4,573,692 | 3/1986 | Frank et al. | 277/152 |
| 4,629,170 | 12/1986 | Warmuth, II | 267/64.27 |
| 4,718,650 | 1/1988 | Geno | 267/64.27 |
| 4,784,376 | 11/1988 | Ecktman | 267/64.27 |
| 4,787,606 | 11/1988 | Geno et al. | 267/64.27 |
| 4,787,607 | 11/1988 | Geno et al. | 267/64.27 |
| 4,852,861 | 8/1989 | Harris | 267/64.27 |
| 4,899,995 | 2/1990 | Hoffman et al. | 267/64.27 |
| 5,005,808 | 4/1991 | Warmuth, II et al. | 267/64.27 |
| 5,127,641 | 7/1992 | Schneider | 267/64.27 |

Primary Examiner—Andres Kashnikow
Assistant Examiner—Kevin D. Rutherford
Attorney, Agent, or Firm—David A. Thomas

[57] ABSTRACT

An air spring has a pair of axially spaced end members and an intervening elastomeric flexible sleeve extending therebetween which forms a fluid pressure chamber. A pair of recesses are formed on an inner surface of an annular clamp ring which cooperate with a pair of corresponding annular projections formed on an outer surface of each of the end members to positionally locate the ring on the end member and to form a pair of pinch areas sealingly clamping the sleeve therebetween. Expansion grooves are formed between the projections and on opposite sides thereof to receive portions of the sleeve therein to form three elastomeric bead-like members, and to change the direction of reinforcing cords within the sleeve. The clamp ring seats upon a shoulder of each of the end members to reduce movement of the clamp ring during operation of the air spring.

11 Claims, 3 Drawing Sheets

CLAMP RING ASSEMBLY FOR AIR SPRING

BACKGROUND OF THE INVENTION

1. Technical Field

The invention relates to clamping means and more particularly to the clamping means adapted to affix a resilient elastomeric sleeve member to a relatively rigid piston member or end cap of an air spring. Specifically, the invention relates to a clamp ring assembly employing a clamping ring having at least a pair of recesses on the inner diameter thereof which coact with a corresponding member of projections on the outer diameter of the piston member or end cap to positionally locate the clamping ring on the piston member and to effectively seal the open end of the elastomeric sleeve therebetween.

2. Background Information

Pneumatic springs commonly referred to as air springs, have been used for many applications, including motor vehicles, for a number of years to provide cushioning between moveable parts of the vehicle, primarily to absorb shock loads impressed on the vehicle axles by the wheels striking an object in the road or falling into a depression. The air spring usually consists of a flexible rubber sleeve or bellows containing a supply of compressible fluid and has one or more pistons movable with respect to the flexible sleeve. The piston causes compression and expansion of the fluid within the sleeve as the sleeve compresses and expands as the vehicle experiences the road shock. The spring sleeve is formed of a flexible elastomeric material containing reinforcing cords, and permits the piston to move axially with respect to another piston or end cap secured within open ends of the sleeve.

The open ends of the sleeves are sealingly connected to the piston and/or opposite end cap, and the integrity of this connection is always one of the important and major aspects in producing an efficient and maintenance free air spring. Another problem with existing air springs, and in particular, the clamp ring therefore, is that the clamp ring will move in its clamped position under dynamic air spring conditions causing movement of the clamped elastomeric material therebetween tending to loosen the sealing engagement and deteriorating the clamp integrity and causing ultimate air spring leakage and failure. This ring movement is especially critical during the jounce or collapsing stroke.

Another problem with existing air springs and the clamping of the elastomeric sleeve ends to the piston member and/or end cap is to secure a sufficiently tight seal to be able to withstand high fluid pressures contained in the fluid chamber without premature leakage or bursting even upon experiencing severe air spring movement and being exposed to the harsh environments on the undercarriage of a vehicle.

Some examples of air springs and band sealing devices are shown in the following patents described below:

U.S. Pat. No. 3,788,628 discloses a pneumatic spring-type system which includes a structure for anchoring the inner ends of a flexible rolling sleeve. The sleeve is positioned between surfaces characterized by having a saw-toothed shape with a circumferential groove and rib on an inner circumferential surface and two ribs on an outer circumferential surface. The opposite sides of the grooves converge at predefined angles with predetermined and matching radius of curvatures, the combination of which provides a gripping action to hold the flexible sleeve firmly in place by means of the saw-tooth design, in cooperation with the matching recess of the ring and sleeve flange.

U.S. Pat. No. 3,870,286 shows a fluid spring wherein the ends of the rolling sleeve are secured by annular clamping rings which engage against the internal surface of the sleeve. The clamping ring secures the rolling sleeve to the working cylinder. The clamping ring contains an annular groove deformation by which the rolling sleeve is held in place by virtue of this interacting groove-shaped design in combination with the clamping force exerted by the ring.

U.S. Pat. No. 4,489,474 relates to means for connecting a tubular flexible member to a piston which includes a recess near the piston end to which is secured a flexible member. The flexible member is wrapped over and around a ring-shaped fitting which secures the flexible member to the piston. The piston comprises a circumferentially extending recess adjacent to its end with the flexible sleeve being positioned and substantially filling the recess of the piston. The ring-shaped fitting is a conventional swaged ring and the end portion of the flexible member is trimmed from the portion extending from the piston ring with the flexible member substantially filling the recess of the shoulder of the piston. The piston employs a serrated edge to assist in griping of the flexible member.

U.S. Pat. No. 4,573,692 discloses an assembly for sealing two members, one of which has a cylindrical surface which supports the seal, wherein a sealing lip is provided to bear against the second member. A cylindrical surface supports the seal which comprises a hollow-cylindrical body having a lip which extends outwardly from the body with an elastomeric band circling the body to hold it firmly in place. The cylindrical surface contains a recess which extends circumferentially around the surface and receives a matching projecting element of the seal which extends from the inside diameter of the cylindrical body.

U.S. Pat. No. 4,629,170 shows a pneumatic spring with a pair of chambers formed by a pair of membranes that are sealingly attached to an axially spaced apart retainer and piston wherein the axial end of the membrane is compressed between a serrated surface of a solid member and a retaining ring. The ring is swaged, fitted or otherwise tightened to produce radial compression against the axial ends of the flexible membrane.

British Patent No. 199,789 discloses a metal securing band which grips a diaphragm and forces it against a tapered end portion of a tubular member.

U.S. Pat. No. 4,718,650 shows an air spring in which the ends of the flexible sleeves are connected to the sealing surfaces of a pair of axially spaced pistons by swaged or crimped clamping rings. The piston clamping surfaces are formed with serrations to assist the retention of the elastomeric material when forced therein by the clamping rings.

Other types of piston and end cap sealing arrangements for air springs are shown in U.S. Pat. Nos. 4,784,376; 4,787,607 and 4,787,606, all of which have been assigned to the Assignee of the present invention.

Another known prior art air spring construction includes a radially extending shoulder formed on the piston member on which the clamping ring seats and sealingly clamps the cut end of the flexible sleeve against a plurality of uniformly raised ribs formed on the axially extending sealing surface of the piston member adjacent the annular shoulder. However, such construction presents problems in that the clamp ring is not positively positioned on the annular shoulder, and is free to move in an upward axial direction upon the air spring experiencing severe jounce or extended positioning.

Many of the problems discussed above are solved by the clamping arrangement shown in U.S. Pat. Nos. 4,899,995 and 4,852,861. These patents show the use of a clamp ring having a single centrally located recess which aligns with an outwardly extending projection formed on the sealing surface of the piston and end member in order to position the clamping ring on the piston or end member. A pair of pinch areas are formed on opposite sides of the projection by outwardly extending annular rings or surfaces on the sealing surfaces of the piston and/or end member. These rings form the pinch areas or zones in cooperation with the axially extending inner annular surface of the clamp ring on opposite sides of the concave recess. Although this clamp ring assembly does solve many of the problems discussed above and is extremely efficient for many applications, it has been found that for certain air spring applications, especially for larger air springs having high internal pressure, it may not provide the necessary clamping power.

Therefore, the need exists for a still further improved clamp ring assembly for air springs which provides increased clamping and sealing for the open ends of the elastomeric member between the clamp ring and end member and/or piston.

SUMMARY OF THE INVENTION

Objectives of the invention include providing an improved clamp ring assembly for air springs, primarily used for motor vehicles, having a piston at one end and an end cap at an axially spaced opposite end, with a flexible elastomeric sleeve extending therebetween and clamped against the respective end cap and piston member by clamp rings to form a fluid tight seal therebetween and provide an intervening pressure chamber.

A still further objective of the invention is to provide such a clamp ring assembly in which movement of the clamp ring is reduced when operating under dynamic conditions by positioning the ring directly adjacent a shoulder of the piston member or an annular flange of the end cap thereby maintaining a positive sealing effect with the elastomeric sleeve clamped between the ring and adjacent end member.

A still further objective of the invention is to provide such an improved clamp ring assembly in which the piston member or end cap clamping surface includes at least a pair of annular projections which act in cooperation with a corresponding number of concave grooves on the clamp ring to facilitate efficient gripping of the elastomeric material therebetween and to alter the direction of the reinforcing cords contained within the elastomeric sleeve, to further increase the clamping effect of the ring, and which positionally locates the clamp ring on the sealing surface of the piston member or end cap.

A further objective is to provide such an improved clamp ring assembly in which annular expansion grooves are formed between the projections on the piston member and end cap member sealing surfaces to permit the elastomeric material to flow therein to form bead-like holding members.

Another objective is to provide such an improved clamp ring assembly in which the outer surface of the clamp ring generally aligns with the adjacent outer surface of the piston or end cap to provide a generally continuous surface between the clamp ring and piston member or end cap over which the elastomeric sleeve rolls, to provide a smooth interface therebetween to reduce wear on the elastomeric sleeve as it moves along the surfaces of the piston member or end cap and clamping ring during dynamic operation of the air spring.

A further objective is to provide such an improved clamp ring assembly in which the radial distance between the outer surfaces of the annular projections of the piston and/or end member sealing surfaces is spaced from the bottom curved surfaces of the concave recesses in the clamp ring a distance generally equal to 50% of the thickness of the elastomeric sleeve to be sealingly clamped therebetween.

Still another objective of the invention is to provide such a clamp ring assembly in which the concave recesses of the clamp ring are separated by generally flat surfaces having the same diameter as the remaining portions of the clamp ring inner surface thereby enabling the clamp ring to be formed from a ring blank having a uniform inner thickness or diameter to achieve the most efficient use of the clamp ring material and to reduce costs of constructing the clamp ring.

These objectives and advantages are obtained by the improved clamp ring assembly of the invention, the general nature of which may be stated as including a pair of end members adapted to be mounted at generally axially spaced locations; a flexible sleeve formed of an elastomeric material containing reinforcing cords and having open ends sealingly engaged with the end members forming a fluid chamber therebetween; an annular axially extending sealing surface formed on at least one of said end members, said sealing surface being formed with a pair of axially spaced annular projections extending radially outwardly; an annular clamp ring located concentrically with respect to the annular sealing surface of said one end member for sealingly clamping one end of the flexible sleeve therebetween, said clamp ring having an axially extending inner clamping surface formed with a pair of recesses, each cooperating with a respective one of the annular projections to positionally locate said ring with respect to said one end member, and for providing a pair of axially spaced pinch areas for clamping the flexible sleeve therebetween and for changing the direction of travel of the reinforcing cords in the clamped sleeve end; at least three grooves being formed in the sealing surface of said one end member providing expansion zones for receiving elastomeric material of the sleeve therein, one of said grooves being intermediate the pair of projections with the other two grooves being located on other sides of said projections; and a radially outwardly extending annular shoulder formed at one end of the annular sealing surface of said one end member for abutting the clamp ring to restrict movement of said clamp ring in the axial direction during operation of the air spring.

BRIEF DESCRIPTION OF THE DRAWINGS

A preferred embodiment of the invention illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
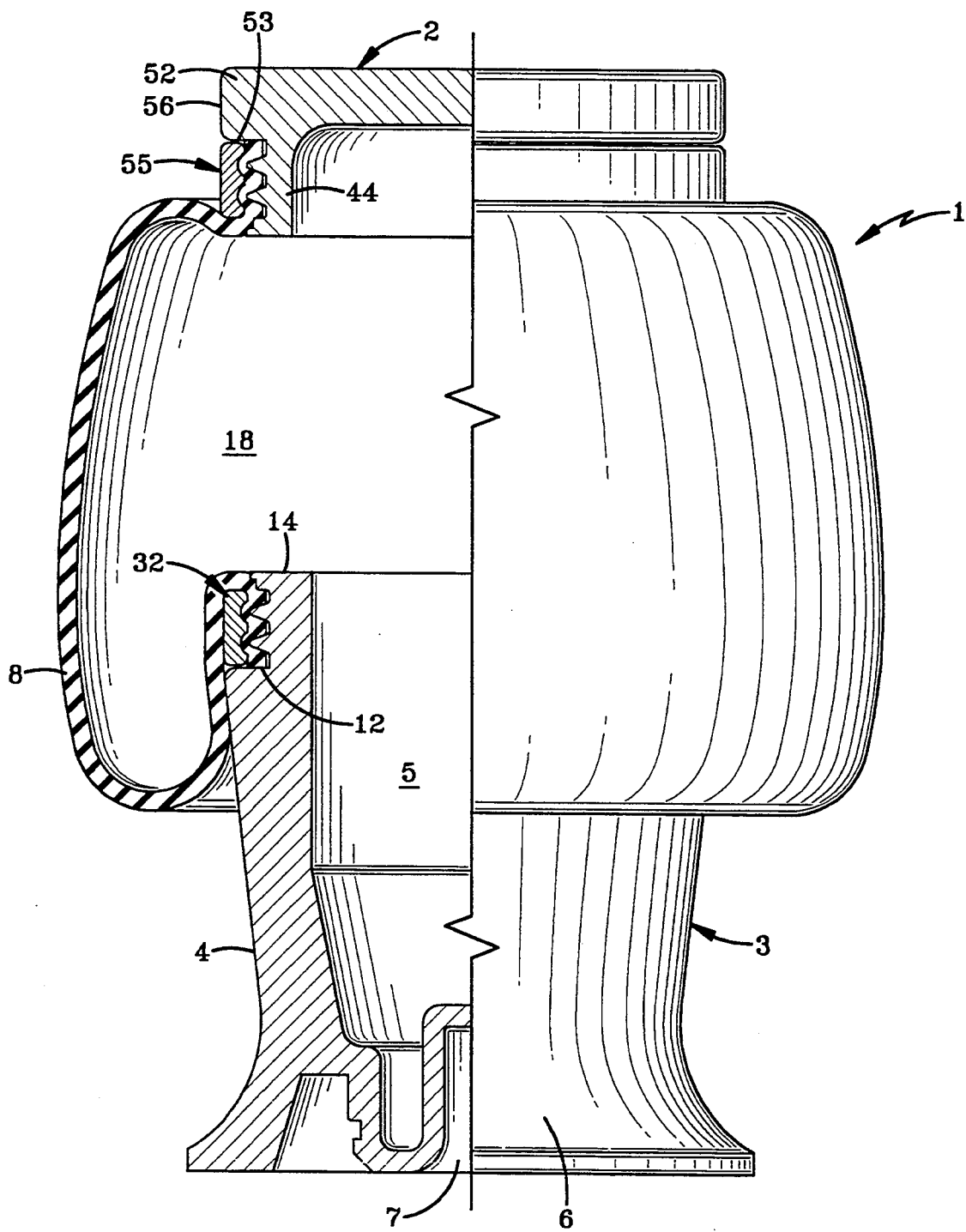
FIG. 1 is an elevational view of the improved clamping ring assembly incorporated into an air spring, with portions broken away and in section, with the air spring being shown in a static at-rest position.

Two of the improved clamp ring assemblies of the invention are shown in FIG. 1 mounted on an air spring, which is indicated generally at 1, and which is shown in an at-rest position. Air spring 1 includes axially spaced end members consisting of an end cap and a piston member, indicated generally at 2 and 3 respectively. Piston member 3 may have various configurations, with that shown in the drawings being an example of one type. Member 3 is cup-shaped having a generally conical shaped outer wall 4 forming an open interior 5 in a base 6 which is formed with a recessed central bottom portion 7. A flexible sleeve 8 formed of elastomeric material and containing internal reinforcing cords 9 (FIGS. 2 and 3), extends between end cap 2 and piston member 3 which are clampingly engaged within the open ends of the sleeve by the clamp ring assembly of the invention, in order to form a fluid pressure chamber 18 therebetween.

Figure 3:
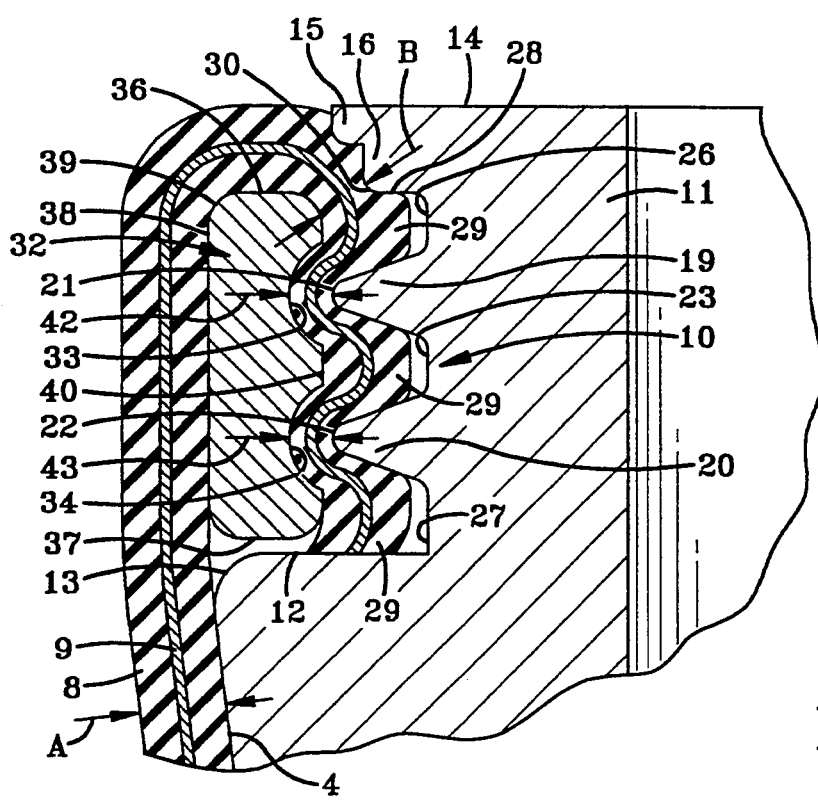
FIG. 3 is a greatly enlarged fragmentary sectional view similar to FIG. 2 showing the clamp ring assembly securing another end of the elastomeric sleeve against the sealing surface of the piston member.

In accordance with the invention, an improved axially extending clamping surface indicated generally at 10, is formed on a reduced diameter upper end portion 11 of piston member 3, shown in detail in FIG. 3. Clamping surface 10 is connected to conical outer wall 4 of the piston member by a radially extending shoulder 12 and a curved corner 13. The open outer end of piston end portion 11 has a radially extending flat surface 14 which terminates in an annular stepped surface having first and second annular portions indicated at 15 and 16, respectively, with portion 15 having a larger diameter than portion 16.

In accordance with the invention, clamping surface 10 includes a pair of annular radially extending clamping projections 19 and 20. Annular projections 19 and 20 are of equal diameters and preferably terminate in convex outer ends 21 and 22, respectively. Projections 19 and 20 are separated by an annular material expansion groove 23 which has an inwardly tapered configuration formed by flat sides which terminate in a generally flat bottom surface, providing a generally truncated configuration.

A pair of material expansion grooves 26 and 27 are formed on the other sides of projections 19 and 20, with groove 26 being formed by one tapered side of projection 19 and a generally flat radially extending surface 28 which merges with stepped portion 16. Groove 27 is formed by a tapered side of projection 20 and the innermost portion of radial shoulder 12.

Grooves 23, 26 and 27 provide expansion areas or zones for the movement of the elastomeric material of flexible sleeve 8 therein, and provide for the formation of three bead-like members 29 which assist greatly to prevent axial pull out of the sleeve end when clamped thereon as described below.

Figure 4:
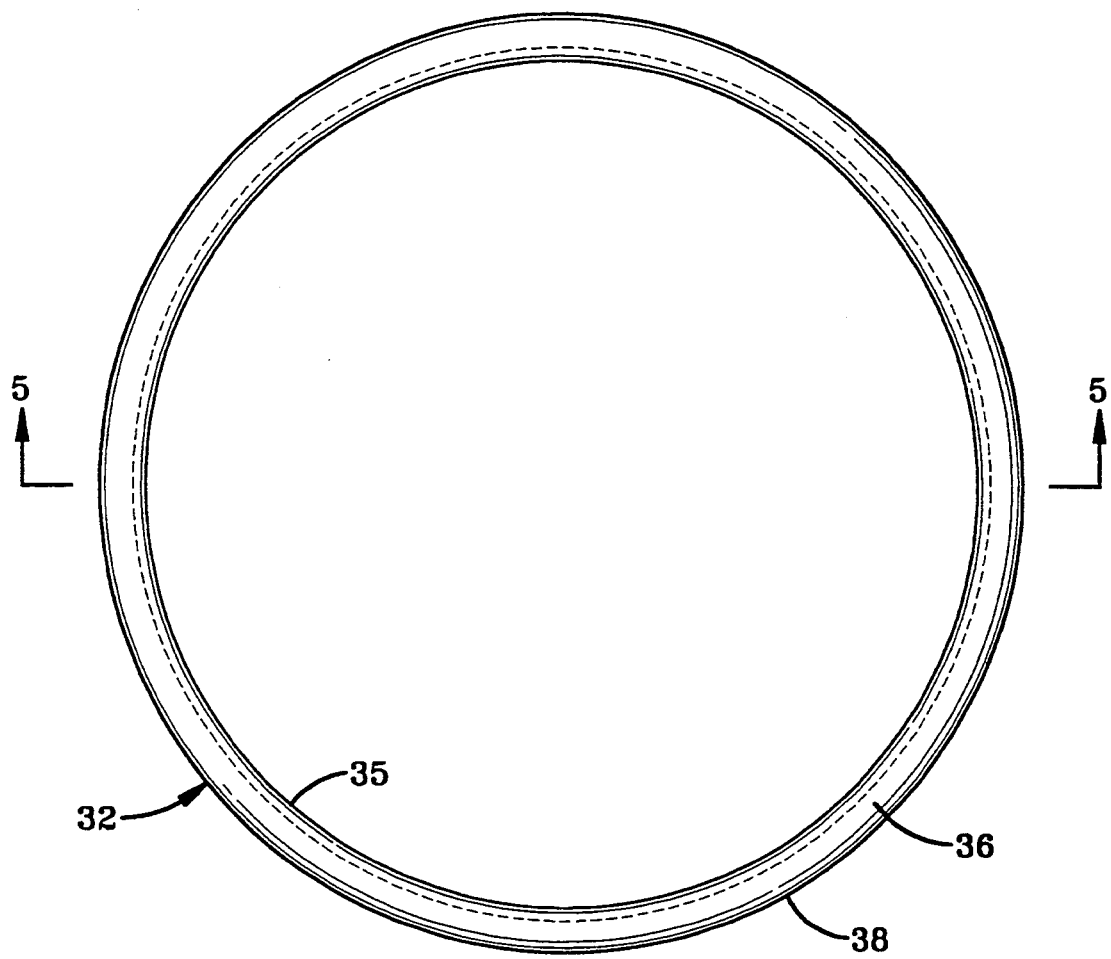
FIG. 4 is a top plan view of the clamp ring of the improved clamp ring assembly of the invention.
Figure 5:
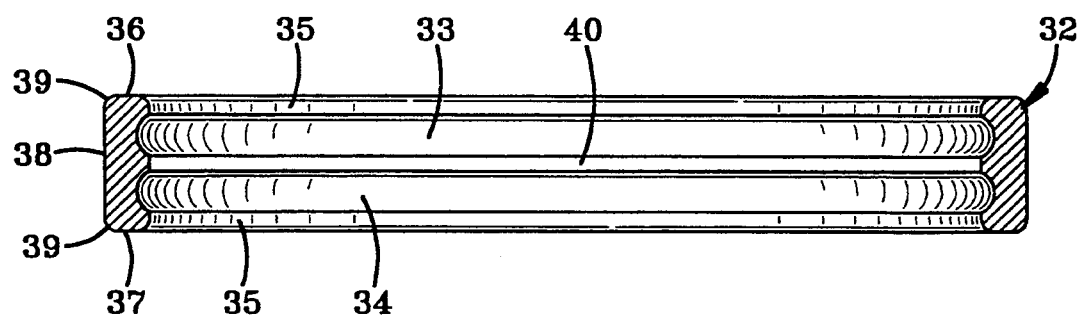
FIG. 5 is a sectional view of the clamp ring taken on line 5—5, FIG. 4.

In further accordance with the invention, the clamp ring assembly includes a clamp ring indicated generally at 32, (FIGS. 4 and 5), preferably formed of aluminum or of a high strength plastic. Ring 32 has a pair of recesses 33 and 34 which are formed in an inner axially extending surface 35 thereof, which extends between circumferential end surfaces 36 and 37. Inner surface 35 preferably is parallel with an axially extending outer diameter ring surface 38, with inner and outer diameter surfaces 35 and 38 being connected to circumferential end surfaces 36 and 37 by four rounded corners 39. Recesses 33 and 34 preferably are concave and have rounded bottom surfaces and are of equal depths, and are separated by a flat annular surface 40. Surface 40 preferably has the same diameter as inner surface 35 which enables ring 32 to be formed out of an annular band having an inner diameter the same as surfaces 35 and 40, which eliminates machining operations thereon, which would be required if surface 40 was of a different diameter than surface 35.

Referring again to FIG. 3, recesses 33 and 34 of clamp ring 32 radially align and cooperate with convex projections 19 and 20 of piston clamping surface 10 to positionally align the clamp ring on the piston sealing surface for receiving the open end of flexible sleeve 8 therebetween. In this position, circumferential end surface 37 of the clamp ring seats upon or is located closely adjacent to annular shoulder 12, which prevents movement of clamp ring 32 in the downward axial direction in reference to FIGS. 1 and 3, during the operation of the air spring. This is especially critical during the jounce of collapse position of the air spring in which piston 3 moves axially towards end cap 2.

In accordance with one of the main features of the invention, convex outer ends 21 and 22 of projections 19 and 20 are spaced from the curved bottom surfaces of clamp ring recesses 33 and 34 a distance within the range of 40% to 60% of the thickness of sleeve 8, which is represented by arrow A in FIG. 3, to provide a pair of spaced pinch areas 42 and 43 on the elastomeric sleeve material. Preferably the distance between outer ends 21 and 22 and the bottom curved surfaces of recesses 33 and 34 is 50% of the thickness of sleeve 8. The top annular portion of inner clamp ring surface 35 is spaced from a rounded corner 30 which connects radial surface 28 with annular portion 16, and is separated therefrom by a distance indicated by arrow B, which again is generally equal to distances A described above, that is between 40% and 60% of the material thickness of sleeve 8 to provide another pinch area.

Furthermore, as shown in FIG. 3, expansion grooves 23, 26 and 27 receive the elastomeric material of sleeve 8 as it is squeezed between the bottom surfaces of recesses 33 and 34 and ends 21 and 22 of projections 19 and 20, which further assists in providing a tight clamping engagement between clamp ring 32 and piston clamping surface 10. The volume provided by the three expansion grooves preferably is greater than the volume of the rubber which is squeezed thereinto, which will permit annular void areas at the bottoms of grooves 23, 26 and 27 to ensure that the desired clamping force is achieved between the projections and ring recesses.

In accordance with another feature of the invention as shown in FIG. 3, reinforcing cords 9 are caused to change directions several times due to the radial outward extensions of projections 19 and 20 into the aligned clamping ring recesses 33 and 34. This provides a tighter and more stable clamping engagement with the trapped sleeve end since a greater force will be required to pull the sleeve end from between the clamp ring and clamping surface of the piston then would be required if the trapped elastomeric material and reinforcing cords were in a generally straight alignment.

Figure 2:
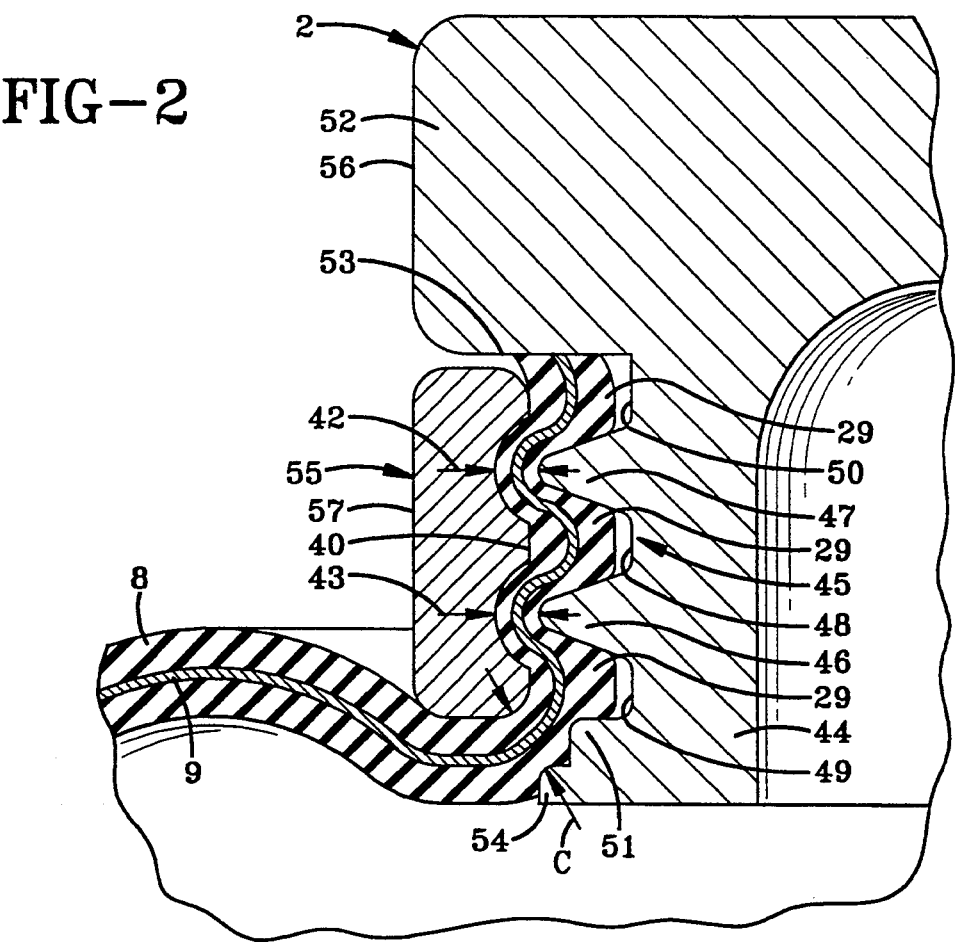
FIG. 2 is a greatly enlarged fragmentary sectional view showing the clamp ring assembly securing one end of the elastomeric sleeve against the sealing surface of an end cap.

Referring to FIGS. 1 and 2, end cap 2 is formed with an annular axially extending body 44 having an outer axially extending annular sealing surface indicated generally at 45. Sealing surface 45 is formed with a pair of projections 46 and 47 similar to piston projections 19 and 20, and three material expansion grooves 48, 49 and 50, similar to expansion grooves 23, 26 and 27 of piston 3. End cap 2 preferably is provided with a radially extending annular top flange 52 having an annular radial shoulder 53 which communicates with end expansion groove 50. The end of end cap 2 opposite top flange 52 has a stepped annular area with a pair of annular portions 51 and 54, with annular portion 54 forming a pivot zone indicated by arrow C, similar to the pivot zone B of piston 3 as shown in FIG. 3. Furthermore, an end cap clamp ring 55 which is similar to clamp ring 32 of the piston member, is provided for clamping the elastomeric sleeve against sealing surface 45, and thus is not described in greater detail.

The relationship of the various grooves and projections of end cap sealing surface 45 in cooperation with clamp ring 55 is similar to that described above with respect to piston clamping surface 10 and clamp ring 32. Also, outer annular surface 56 of end cap flange 52 axially aligns with outer annular surface 57 of clamp ring 55 to provide a generally continuous surface over which flexible sleeve 8 will move when the air spring is in the jounce position to avoid any sharp bends and to provide continuous transition between the aligned surfaces in a similar manner as provided by outer surface 38 of clamp ring 32 and outer wall 4 of the piston member as shown in FIG. 3.

It has been found that annular projections 19 and 20, and projections 46 and 47, in cooperation with the bottom surfaces of the corresponding concave recesses formed in clamp rings 32 and 55, provides increased holding power for maintaining the trapped sleeve ends, than that provided by the pair of spaced pinch zones provided by the single projection and recess and pair of adjacent projections of the clamp ring assembly of U.S. Pat. No. 4,899,995. This increased holding power is believed to occur due to the additional direction changes of the sleeve material and in particular by changes of direction of the reinforcing cords 9 embedded therein. Also, this groove configuration in the piston and end cap sealing surfaces provides for the formation of three bead-like members 29 which further assist in trapping the sleeve ends in their respective end members and further resist pull-out, even when a relatively high internal pressure is placed within fluid chamber 18.

Accordingly, the improved clamp ring assembly for an air spring is simplified, provides an effective, safe, inexpensive, and efficient assembly which achieves all the enumerated objectives, provides for eliminating difficulties encountered with prior clamping assemblies, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved clamp ring assembly for an air spring is constructed and used, the characteristics of the construction, and the advantageous, new and useful results obtained; the new and useful structures, devices, elements, arrangements, parts and combinations, are set forth in the appended claims.

I claim:

1. An air spring including:
   a) a pair of end members adapted to be mounted at generally axially spaced locations;
   b) a flexible sleeve formed of an elastomeric material containing reinforcing cords and having open ends sealingly engaged with the end members forming a fluid chamber therebetween;
   c) an annular axially extending sealing surface formed on at least one of said end members, said sealing surface being formed with a pair of axially spaced annular projections extending radially outwardly and terminating in outer ends;
   d) an annular clamp ring located concentrically with respect to the annular sealing surface of said one end member for sealingly clamping one end of the flexible sleeve therebetween, said clamp ring having an axially extending inner clamping surface formed with a pair of recesses having bottom surfaces, each of said recesses cooperating with a respective one of the annular projections to positionally locate said ring with respect to said one end member, and for providing a pair of axially spaced pinch areas for clamping the flexible sleeve therebetween and for changing the direction of travel of the reinforcing cords in the clamped sleeve end, with the outer ends of the projections being spaced radially from the bottom surfaces of the recesses a distance within the range of 40% and 60% of the thickness of the flexible sleeve;
   e) at least three grooves being formed in the sealing surface of said one end member providing expansion zones for receiving elastomeric material of the sleeve therein, one of said grooves being intermediate the pair of projections with the other two grooves being located on other sides of said projections; and
   f) a radially outwardly extending annular shoulder formed at one end of the annular sealing surface of said one end member for abutting the clamp ring to restrict movement of said clamp ring in the axial direction during operation of the air spring.

2. The air spring defined in claim 1 in which an end of the end member sealing surface opposite of the annular shoulder, terminates in an annular stepped surface.

3. The air spring defined in claim 2 in which the annular stepped surface has first and second annular portions, said first portion having a diameter generally equal to the diameter of the pair of annular projections.

4. The air spring defined in claim 3 in which the second portion of the annular stepped surface forms a pinch area with an inner edge of the clamp ring.

5. The air spring defined in claim 1 in which the diameters of the two annular projections are equal.

6. The air spring defined in claim 1 in which the outer ends of the annular portions are spaced radially from the bottom surfaces of the recesses a distance equal to 50% the thickness of the flexible sleeve.

7. The air spring defined in claim 1 in which the outer ends of the annular projections are convexely curved.

8. The air spring defined in claim 1 in which each of the three grooves extends radially inwardly into the said one end member generally the same distance.

9. The air spring defined in claim 1 in which the clamp ring recesses are concavely curved.

10. The air spring defined in claim 1 in which the two recesses are separated by an annular generally flat surface which forms part of the axially extending inner clamping surface of the clamp ring, said flat surface being substantially of the same diameter as said axially extending inner surface of the clamp ring.

11. The air spring defined in claim 1 in which said one end member is a piston having a body; in which the annular shoulder terminates into the piston body by a curved corner; and in which the clamp ring has an outer annular axially extending surface which generally aligns with said curved corner of the body to provide a substantially continuous surface on which the flexible sleeve may roll during operation of the air spring.

* * * * *